No. 644,196. Patented Feb. 27, 1900.
S. E. CLARKSON.
MOTOR SUSPENSION.
(Application filed Apr. 4, 1899.)
(No Model.)
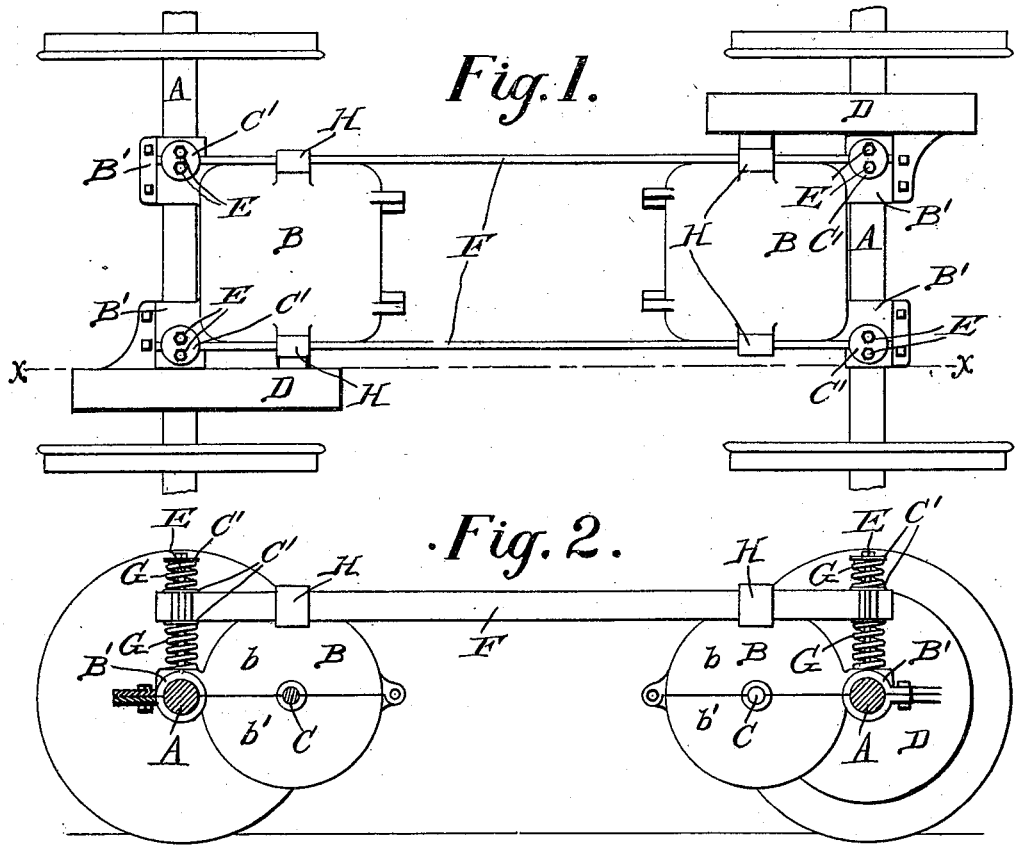
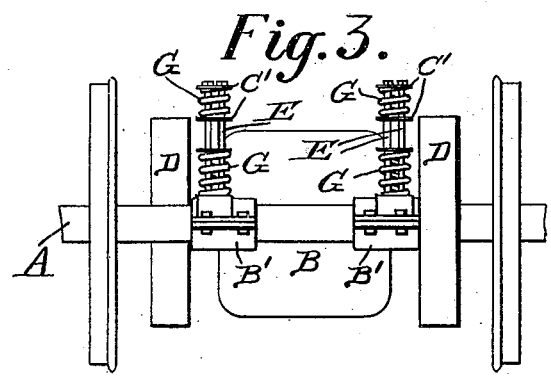
WITNESSES:
M. E. Sharpe.
A. M. Moses.
INVENTOR
S. E. Clarkson
BY
Richard Eyre
ATTORNEY.
THE NORRIS PETERS CO., PHOTO-LITHO., WASHINGTON, D. C.

UNITED STATES PATENT OFFICE.

SAMUEL E. CLARKSON, OF JOHNSTOWN, PENNSYLVANIA, ASSIGNOR TO THE JOHNSON COMPANY, OF PENNSYLVANIA.

MOTOR SUSPENSION.

SPECIFICATION forming part of Letters Patent No. 644,196, dated February 27, 1900.

Application filed April 4, 1899. Serial No. 711,731. (No model.)

*To all whom it may concern:*

Be it known that I, SAMUEL E. CLARKSON, of Johnstown, in the county of Cambria and State of Pennsylvania, have invented a new and useful Improvement in Motor Suspensions, of which the following is a full, clear, and exact description, reference being had to the accompanying drawings, which form a part of this specification.

My invention relates to a certain new and improved suspension for electric-railway motors; and it has for its object the provision of a simple and durable suspension by which the axles are relieved from the dead-weight of the motors, but which at the same time retains the advantage of a sleeve connection between the motors and the driven axles, and also, to provide, without multiplication or complication of parts, a motor suspension which is independent of the truck-frame and is elastically supported upon the axles in a manner to equalize to a large extent the vertical movement and to hold them more steady in running positions, while at the same time they are effectively cushioned, and strains due to rigid connections are avoided, as are also the deleterious effects of that looseness which is almost sure to result from the absence of a flexible or spring support. I attain these objects by the means which I have shown and will now describe.

Referring to the drawings, Figure 1 is a plan view of such portions of an electric-car truck and its motors as are sufficient to illustrate the character and application of my improved motor suspension. Fig. 2 is a section on the line X X of Fig. 1, and Fig. 3 is an end view.

In the drawings, A A designate the driven axles, and B B the motor-casings, composed of upper and lower shell-sections $b$ $b'$. The motor-armatures revolve in these casings on the shafts C and drive the axles by means of meshing gears inclosed in the gear-casings D.

The casings B B are formed with sleeve extensions B', which surround the respective axles and serve to center the motors thereon. Said sleeve extensions are each provided with a pair of vertical guide rods or posts E.

F designates the suspension-frame, comprising, preferably, two parallel bars, which extend longitudinally of the truck and whose end portions are received in the space between the guide rods or posts E of opposite pairs of said rods or posts and rest in such spaces between upper and lower spring-cushions G, placed on said rods or posts. The lower springs are seated on the motor-case extensions B' and the upper springs on the frame-bars F, suitable plates C' being employed to confine the upper springs and to provide a proper bearing for both upper and lower springs in the said bars.

Each motor-casing has side lugs H, which are slotted to receive the bars of the frame, and thus suspend and support the motor therefrom.

It will be observed that the spring-frame not only forms an elastic support for the motors and relieves the axles of their deadweight, but that by reason of its limited upward and endwise movements it operates as an equalizer, whereby vertical movement of either motor independently of the motion of the truck is transmitted to the opposite end portion of the frame and is received upon the springs there, as well as by the more immediate springs. In this manner the tendency of the motors to throw in opposite directions by reason of the forces of rotation of their armatures is received by the frame and equalized by its springs, so that such motion is considerably reduced or limited, the motors are held much more steady in running, and injurious rebounding action is prevented.

In a motor suspension of this type the entire weight of the motors is of course carried by the axles, and it is therefore desirable that as large a percentage of that weight as possible shall be transmitted to the axles through springs. This is accomplished in the present suspension by reason of the fact that the engagement of the side lugs H of the motors with the side bars F is at points almost directly over the center of gravity of the motors, thereby throwing nearly all the weight upon said bars and to the axles through the springs G.

It will also be observed that the parts comprising the suspension are few in number, strong and durable in character, are conveniently located, and do not unduly complicate the truck.

I do not desire to limit myself to the specific construction which I have shown and described for the purpose of illustrating the invention, for many modifications can be made without departing from the spirit and scope of the invention.

Having thus described my invention, what I claim as new, and desire to secure by Letters Patent, is—

1. The combination with a pair of motors, sleeved to their respective axles, of a frame extending from axle to axle and supported by the sleeve portions of the motors, said frame in turn supporting said motors, the connection between said motors and the frame being substantially in the lines of the centers of gravity of the motors.

2. The combination with a pair of motors sleeved to their respective axles, of a pair of side bars extending from axle to axle and supported at their ends from the sleeve portions of the motors, each of said side bars supporting one side of both of said motors at points substantially in the lines of the centers of gravity of the motors.

3. The combination with a pair of motors sleeved to their respective axles, of a pair of side bars extending from axle to axle, side connections between the said bars and the motors at points substantially in the lines of the centers of gravity of said motors, and springs between the said side bars and each of said motors.

4. The combination with the motors sleeved to the driven axles, of a suspension-frame spring-supported at its ends upon the sleeve portions of the motors, and means on the motors engaging the said bars at points substantially over the center of gravity of the motors.

5. The combination with the motors sleeved to the driven axles, of a suspension-frame common to both motors and spring-supported over the axles, and connections between the said frame and the motors at points substantially in the line of the centers of gravity of the motors.

6. The combination with the motors sleeved to the axle, and having spring-seats and springs above the axle, of a suspension-frame connected to the motors at points between the axles and substantially in the line of the centers of gravity of the motors, said frame being seated upon said springs.

7. The combination with the motors centered on the driven axles, and having springs or cushions adjacent to the axles, of a suspension-frame connected to both motors between the axles and at points substantially in the vertical lines of the centers of gravity of the motors, and supported by said springs or cushions to respond to vertical movement of both motors.

8. The combination with the driven axles and the motors centered thereon, of a suspension-frame connected to the motors at points between the axles and substantially in the vertical lines of the centers of gravity of the motors, and elastically connected thereto at points above the axles.

9. The combination with the axles, and the motors having their casings sleeved thereto, of a suspension and equalizing frame by which said motors are supported, elastic supports for said frame carried by the said casings and connections between the said casings and the said frame at points substantially in the vertical lines of the centers of gravity of the motors.

10. The combination with the axles, and the motor-casings having extensions sleeved on said axles, and provided with spring-seats on said extensions, of the suspension-frame elastically supported on said seats, said frame being disconnected from the truck-frame and axles and projections on the motor-casings loosely engaging the said frame.

11. The combination of the axles, the motor-casings sleeved thereto, and provided with guide extensions above the axle, the upper and lower cushions seated on said extensions, and a suspension-frame whose end portions are seated between the said cushions together with projections on the motor-casings which embrace the said frame.

12. The combination of the axles, the motor-casings having extensions sleeved to said axle, guides on said extensions, springs carried by said guides, a suspension-frame whose end portions are seated in said guides and between said springs, and connections between the said frame and the motor-casings at points substantially in the vertical lines of the centers of gravity of the said motors.

13. The combination of the axles, the motor-casings having sleeve extensions for engagement with said axles, and side lugs to receive a suspension-frame, guides carried by said sleeve extensions, springs carried by said guides, and the suspension-frame having its end portions seated in said guides and against the said springs and also engaging said lugs.

14. The combination with the two motor-casings having the sleeve extensions, the guides carried by said extensions, and the slotted side lugs, of the suspension-frame movably engaging said lugs or extensions, and elastically seated in said guides.

15. The combination with the axles, the motor-casings having the sleeve extensions engaging said axles, the guide rods or posts carried by said extensions, and the slotted side lugs, of the suspension-frame consisting of a pair of longitudinal bars which pass through said slotted lugs and whose end portions are seated between said guide-rods and springs carried by said guide-rods and acting upon said frame in both vertical directions, substantially as specified.

16. A motor suspension, comprising rigid longitudinal bars connecting and suspending the two motors of a car centered on its driven axles, and elastic supports carried by the motors and carrying said frame, substantially as specified.

In testimony whereof I have affixed my signature in presence of two witnesses.

SAMUEL E. CLARKSON.

Witnesses:
W. MIER BROWN,
MYRTLE E. SHARPE.